(12) United States Patent
Xu et al.

(10) Patent No.: US 11,410,016 B2
(45) Date of Patent: Aug. 9, 2022

(54) SELECTIVE PERFORMANCE OF DETERMINISTIC COMPUTATIONS FOR NEURAL NETWORKS

(71) Applicant: Alibaba Group Holding Limited, George Town (KY)

(72) Inventors: Lingjie Xu, San Jose, CA (US); Wei Wei, Milpitas, CA (US)

(73) Assignee: Alibaba Group Holding Limited

(*) Notice: Subject to any disclaimer, the term of this patent is extended or adjusted under 35 U.S.C. 154(b) by 679 days.

(21) Appl. No.: 16/395,764

(22) Filed: Apr. 26, 2019

(65) Prior Publication Data

US 2020/0342287 A1     Oct. 29, 2020

(51) Int. Cl.
  *G06N 3/04*    (2006.01)
  *G06K 9/62*    (2022.01)
  *G06N 3/08*    (2006.01)
  *G06N 7/00*    (2006.01)

(52) U.S. Cl.
  CPC ............ *G06N 3/04* (2013.01); *G06K 9/6256* (2013.01); *G06N 3/0454* (2013.01); *G06N 3/08* (2013.01); *G06N 7/005* (2013.01)

(58) Field of Classification Search
  CPC ........ G06N 20/00; G06N 20/10; G06N 20/20; G06N 3/02; G06N 3/04; G06N 3/0454; G06N 3/08; G06N 3/082; G06N 7/00; G06N 7/005; G06N 7/046; G06K 9/6256
  See application file for complete search history.

(56) References Cited

U.S. PATENT DOCUMENTS

| | | | |
|---|---|---|---|
| 9,396,415 | B2 | 7/2016 | Chertok |
| 9,563,825 | B2 | 2/2017 | Shen |
| 9,786,036 | B2 | 10/2017 | Annapureddy |
| 9,965,863 | B2 | 5/2018 | Xu |
| 10,311,342 | B1 | 6/2019 | Farhadi |
| 2016/0328644 | A1 | 11/2016 | Lin |
| 2016/0358068 | A1 | 12/2016 | Brothers |
| 2016/0358070 | A1 | 12/2016 | Brothers |
| 2018/0032844 | A1 | 2/2018 | Yao |
| 2018/0096226 | A1 | 4/2018 | Aliabadi |

(Continued)

OTHER PUBLICATIONS

Akhlaghi et al., SnaPEA: Predictive Early Activation for Reducing Computation in Deep Convolutional Neural Networks, Proceedings of the 45th International Symposium on Computer Architecture (ISCA), 2018, pp. 1-12.

*Primary Examiner* — Shane D Woolwine
(74) *Attorney, Agent, or Firm* — Van Pelt, Yi & James LLP

(57) ABSTRACT

Selective performance of deterministic computations for neural networks is disclosed, including: obtaining a statistical model for a selection layer of the neural network, the statistical model indicating probabilities that corresponding values are selected by the selection layer, the statistical model being generated using historical data; selectively performing a subset of a plurality of deterministic computations on new input data to the neural network, the plurality of deterministic computations being associated with the deterministic computation layer, the selective performance of the deterministic computations being based at least in part on the statistical model and generating a computation result; and outputting the computation result to another layer in the neural network.

20 Claims, 12 Drawing Sheets

(56) References Cited

U.S. PATENT DOCUMENTS

| | | |
|---|---|---|
| 2018/0137406 A1 | 5/2018 | Howard |
| 2018/0181857 A1 | 6/2018 | Mathew |
| 2018/0300624 A1 | 10/2018 | El-Khamy |
| 2019/0147332 A1 | 5/2019 | Lagudu |
| 2019/0378014 A1* | 12/2019 | Yamamoto ............. G06N 3/082 |
| 2020/0234130 A1* | 7/2020 | Yan ...................... G06N 3/0454 |
| 2020/0242734 A1* | 7/2020 | Wang ................... G06K 9/4628 |

* cited by examiner

Input → Conv A → ReLU A → Pool A → Conv B → ... → Fully Connected

FIG. 2

ReLU Layer Statistical Model,
Threshold Probability that Value will be Positive ≥ 75%

Selected (Positive) Value

Not Selected Value

Before Use of Statistical Model

Input → Conv A → Pool A → Conv B → ...

After Use of Statistical Model

Input → Conv A' → Conv B → ...

FIG. 9

Before Use of Statistical Model

Input → Conv A → ReLU A → Conv B → ...

After Use of Statistical Model

Input → Conv A' → Conv B → ...

SELECTIVE PERFORMANCE OF DETERMINISTIC COMPUTATIONS FOR NEURAL NETWORKS

BACKGROUND OF THE INVENTION

Neural networks are an important tool in machine learning techniques. Neural networks are now widely used in various industries. Recognizing classes of images, recognizing voices, and machine translations are just three example applications of neural networks. Given the wide adoption of neural networks and the vast volume of data they are given to analyze, running neural networks in one or more computing devices in data centers consumes significant computing resources. Traditional neural networks are computationally expensive because of the number of operations that they require and also the number of parameters that are used by each operation. Thus, more efficient neural networks are needed.

BRIEF DESCRIPTION OF THE DRAWINGS

Various embodiments of the invention are disclosed in the following detailed description and the accompanying drawings.

FIG. 2 is a diagram showing an example sequence of layers in a convolutional neural network.

FIG. 9 is a diagram showing how the use of a statistical model that is generated for a pooling layer can be used to modify the sequence of layers in a convolutional neural network.

FIG. 10 is a diagram showing how the use of a statistical model that is generated for a ReLU layer can be used to modify the sequence of layers in a convolutional neural network.

DETAILED DESCRIPTION

The disclosure can be implemented in numerous ways, including as a process; an apparatus; a system; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Neural networks are used to process and make sense of data. One type of neural networks, convolutional neural networks, is used to analyze visual imagery. Some common applications of convolutional neural networks are in image recognition, video recognition, recommendation systems, and image classification.

Figure 1:
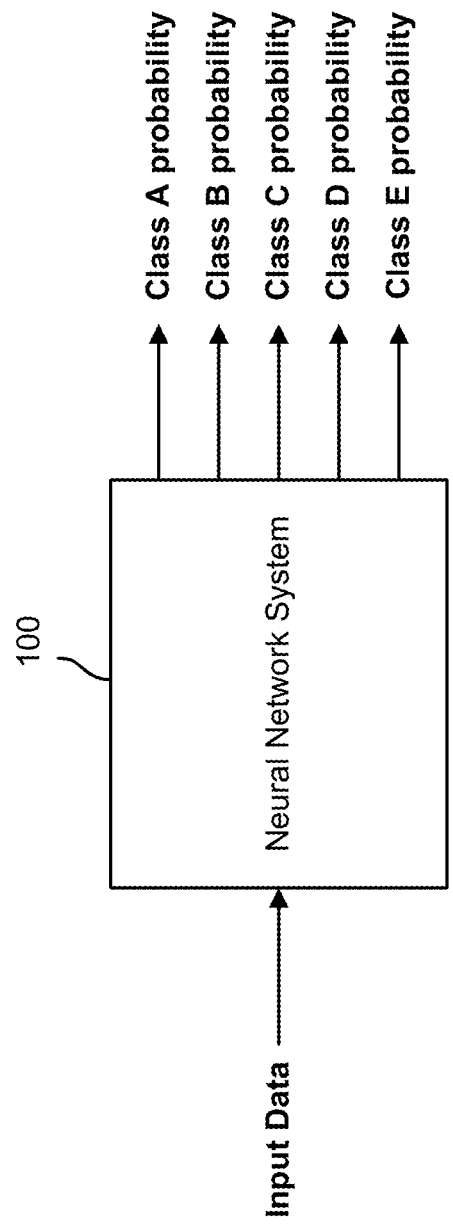
FIG. 1 is a diagram showing an example input and output of a neural network system.

FIG. 1 is a diagram showing an example input and output of a neural network system. As shown in the example, input data is input into neural network system 100. For example, neural network system 100 may be a convolutional neural network, a feedforward neural network, and a recurrent neural network. If neural network system 100 were a convolutional neural network that is used to classify image data, then the input data may comprise an image, for example. After analyzing the input data, neural network system 100 outputs various probabilities that the input data belongs to respective ones of a set of classes (e.g., how likely an image corresponds to classes such as a human, a flower, or a dog). In the example of FIG. 1, neural network system 100 outputs a respective probability that the input data belongs to each of Class A, Class B, Class C, Class D, and Class E. For example, the class associated with the highest probability is determined as the class that the input data belongs.

One example neural network is the convolutional neural network. A convolutional neural network includes an input layer and an output layer and also several hidden layers in between. The hidden layers in a convolutional neural network include convolutional layer(s), rectified linear unit (ReLU) layer(s), (maximum and/or minimum) pooling layer(s), and fully connected layer(s), for example. The convolutional neural network is arranged in a sequence of hidden layers, where the result of one layer is passed on to be processed as the input to the next hidden layer in the sequence. FIG. 2, below, shows an example convolutional neural network with some of the hidden layers described as follows:

Convolutional layer: In a convolutional layer, convolution operations are applied to various portions (e.g., subregions) of the input data (e.g., an image or rather, an array of pixel values), where each portion of the input data is determined by dimensions of a filter (which is also sometimes referred to as a "kernel" or a "neuron"). The filter includes an array of weights (values). For example, for an input image that is 32×32 of pixel values (ignoring the 3 RGB values) and a 5×5 convolutional filter, the convolutional filter is slid across the input image and conventionally, a convolution operation is performed between each 5×5 subregion/cell of the input image that is within the dimensions of the convolutional filter (this subregion is also called the "receptive field") and the corresponding weights that are included in the convolutional filter. The result of each convolution operation is a value that is output by the convolutional layer. In the specific example of a convolutional layer that receives a 32×32 pixel values image as an input and a 5×5 convolutional filter and a stride of 1 are used, the output of the convolutional layer is a 28×28 array. The output from a convolutional layer can be referred to as "an activation map" or "a feature map."

ReLU layer: A ReLU layer typically follows a convolutional layer in a convolutional neural network. The ReLU layer introduces nonlinearity to the result (activation map or feature map) that is output by a preceding convolutional layer. The ReLU layer applies the function $f(x)=\max(0, x)$ to each of the values of the input that it had received from the preceding (e.g., convolutional) layer. Such a function keeps all the positive input values and changes all the negative input values to zero. In some embodiments, the ReLU layer is referred to as a "selection layer" because the ReLU layer keeps (selects) the input values that are positive while zeroing out (not selecting) the input values that are not positive.

Pooling layer: A pooling layer is a downsampling layer. The pooling layer takes a pooling filter (e.g., 2×2) and a stride (the number of units that the pooling filter shifts for each convolutional operation) of the same length (e.g., a 2×2 pooling filter would have a stride of 2) and applies it to different subregions of the input array (the output from the preceding layer of the convolutional neural networks). The pooling layer selects one value from the input values within each subregion. If the pooling layer is a maximum pooling layer, then the selected value is the maximum of the input values in the subregion. Otherwise, if the pooling layer is a minimum pooling layer, then the selected value is the minimum of the input values in the subregion. In various embodiments, the pooling layer is referred to as a "selection layer" because the pooling layer keeps (selects) the input values that are the maximum (or minimum, depending on the type of pooling layer) within the dimensions of a given pooling filter while omitting/ignoring (unselecting) the input values that are not the maximum (or minimum, depending on what the type of pooling layer) within the pooling filter.

Fully connected layer: A fully connected layer takes the input values (that were output by a preceding convolutional, ReLU, or pooling layer) and outputs an N dimensional vector, where N is the number of classes that the neural network has to select from. Referring back to FIG. 1, there were five possible classes (Class A, Class B, Class C, Class D, and Class E) to which the input data into the convolutional neural network could belong to and therefore, N=5 in the example of FIG. 1.

FIG. 2 is a diagram showing an example sequence of layers in a convolutional neural network. In the example of FIG. 2, the convolutional neural network includes an input layer that receives input data, which the input layer in turn passes (e.g., without modification) to Convolutional A layer ("Cony A"). Cony A processes the input data and the output volume of Cony A is then input into ReLU A Layer ("ReLU A"). The output volume of ReLU A is then input into Pooling A Layer ("Pool A"). The output volume of Pool A is then input into Convolutional B Layer ("Cony B"). The output volume of Cony B is then input into one or more other layers before the output is finally input into the Fully Connected layer, which outputs probabilities that the input data belongs to each of N classes. As shown in example in FIG. 2, a convolutional neural network may include one or more types of layers (e.g., convolutional layer, pooling layer, ReLU layer) and also more than one instance of a certain type of layer. The example convolutional neural network of FIG. 2 includes two convolutional layers, Cony A and Cony B. While the example convolutional neural network of FIG. 2 shows only one instance of a pooling layer (Pool A) and one instance of a ReLU layer (ReLU A), a convolutional neural network may have one or more instances of the pooling layer or one or more instances of the ReLU layer.

As shown in the example of FIG. 2, a convolutional neural network often includes multiple convolutional layers, where each convolutional layer conventionally includes a large number of convolutional operations. Selectively reducing the number of convolutions that needs to be performed for a convolutional layer in convolutional neural networks is desirable to reduce the computation and power resources that are typically devoted to implementing the convolutional layer.

Embodiments of selective performance of deterministic computations associated with neural networks are described herein. For example, a deterministic computation in a convolutional neural network includes a convolution operation that is performed in a convolutional layer, which is an example of a deterministic computation layer. A statistical model is generated for a selection layer of a neural network. The statistical model indicates probabilities that corresponding values are selected by the selection layer. The statistical model is generated using historical data. Deterministic computations of a deterministic computation layer are selectively performed on new input data to the neural network. The selective performance of the deterministic computations is based at least in part on the statistical model and generates a computation result. The computation result is then output to another layer in the neural network.

While the convolutional neural network is often mentioned herein as an example of a neural network and a convolution operation is often mentioned herein as an example of a deterministic computation, various embodiments described herein may apply to other neural networks and other deterministic computations thereof. For example, deterministic computations may occur within a fully connected layer or an embedding layer in a neural network.

Figure 3:
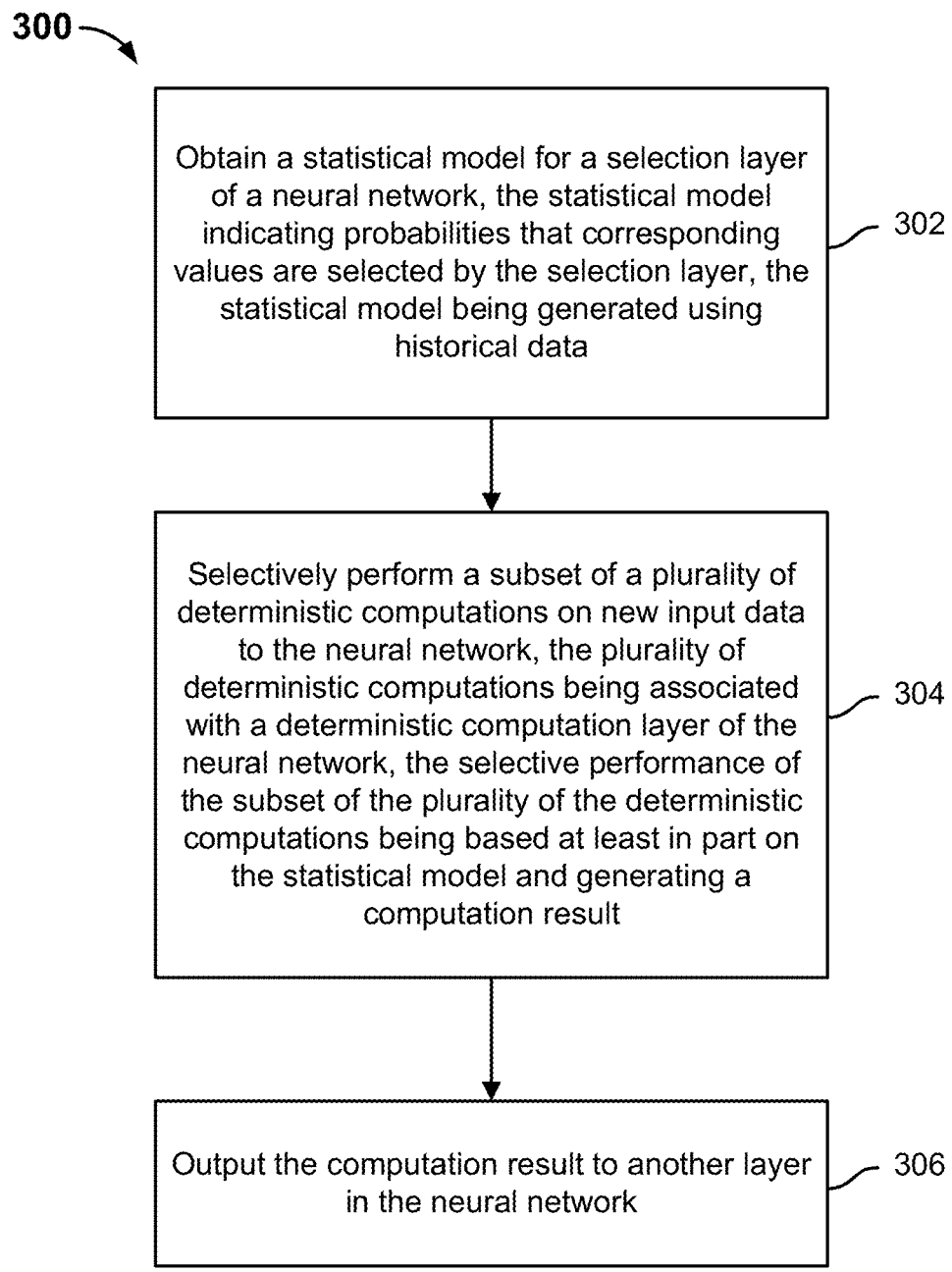
FIG. 3 is a flow diagram showing an embodiment of a process for selectively performing deterministic computations associated with a deterministic computation layer in a neural network.

FIG. 3 is a flow diagram showing an embodiment of a process for selectively performing deterministic computations associated with a deterministic computation layer in a neural network. In some embodiments, process 300 is performed at neural network system 100 of FIG. 1.

At 302, a statistical model is obtained for a selection layer of a neural network, the statistical model indicating probabilities that corresponding values are selected by the selection layer, the statistical model being generated using historical data. In some embodiments, a statistical model is generated. In some embodiments, the statistical model is accessed from storage. In various embodiments, the neural network comprises a convolutional neural network. In various embodiments, a "selection layer" comprises either a pooling layer or a ReLU layer. The statistical model indicates for each value in an input volume (e.g., array) to (e.g., a particular instance of) the selection layer, a probability that the value would be selected by (e.g., that instance of) the selection layer for its output. The probability that each value (e.g., unit within the input array) of the input array to the selection layer would be selected for the selection layer's output is determined based on historical instances of the selection layer processing data. For example, the historical instances of the selection layer processing data occurred when the convolutional neural network that included the selection layer had been trained and/or validated using a body of image data. Examples of "selecting" a value by a ReLU layer or a pooling layer are described in further detail below.

At 304, a subset of a plurality of deterministic computations is selectively performed on new input data to the neural network, the plurality of deterministic computations being associated with a deterministic computation layer of the neural network, the selective performance of the subset of the plurality of the deterministic computations being based at least in part on the statistical model and generating a computation result. In various embodiments, a "deterministic computation" comprises any computation that always yields the same output for a given input, as opposed to non-deterministic computations that rely on the external state (e.g., a random value) other than the input and a preceding computation, for example. In various embodiments, the deterministic computation layer comprises a convolutional layer. In various embodiments, given the statistical model, various deterministic computations (e.g., convolutional operations) that would be performed by a convolutional layer that typically precedes the selection layer (for which the statistical model was generated) are omitted when the convolutional neural network is subsequently applied to a new input (e.g., image), as will be described in further detail below. Furthermore, when the convolutional neural network is subsequently applied to a new input data, the instance of the selection layer (for which the statistical model was generated), which followed the convolutional layer, is also not implemented or implemented but not applied.

At 306, the computation result is output to another layer in the neural network. The computation result that is output by the convolutional layer, in which convolution operations were selectively performed at step 304, is output to the next layer in the neural network, where the other layer is not the selection layer from which the statistical model was generated.

Figure 4:
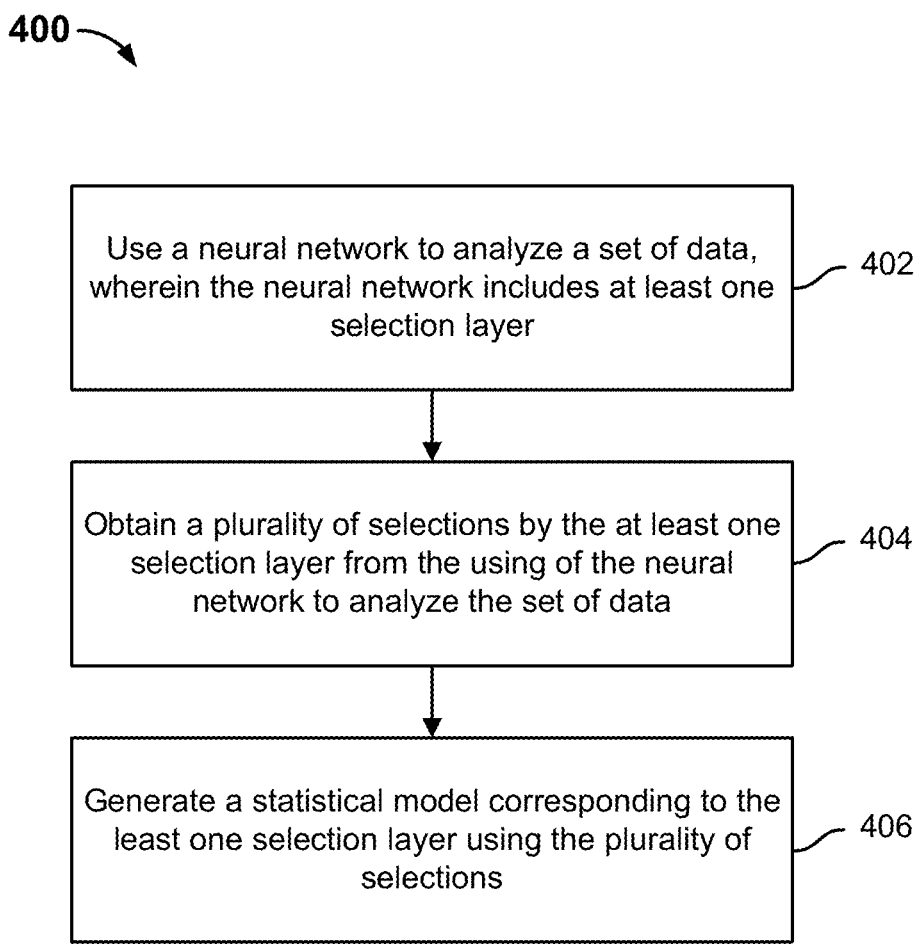
FIG. 4 is a flow diagram showing an example of a process for generating a statistical model corresponding to a selection layer.

FIG. 4 is a flow diagram showing an example of a process for generating a statistical model corresponding to a selection layer. In some embodiments, process 400 is performed at neural network system 100 of FIG. 1. In some embodiments, process 400 can be used to implement 302 of process 300 of FIG. 3.

Process 400 is just one example of a statistical model that can be generated for a particular instance of a selection layer within a neural network (e.g., a convolutional neural network). In various embodiments, process 400 is performed using a neural network to generate a statistical model before the deterministic computations (e.g., within a convolutional layer) are selectively performed on a new input data to the neural network.

In various embodiments, the neural network is a convolutional neural network. The convolutional neural network may have multiple types of selection layers such as ReLU and (e.g., maximum or minimum) pooling layers. Furthermore, the convolutional neural network may include one or more instances of a same type of selection layer. For example, the convolutional neural network includes two or more instances of a ReLU layer or two or more instance of a pooling layer, where each instance of a specific type of selection layer is located in a different position within the sequence of layers of the convolutional neural network.

In some embodiments, where there is more than one instance of a type of a selection layer in a neural network, process 400 is configured to generate a statistical model for a particular instance of that type of selection layer in the neural network. Referring back to FIG. 2, while there may be more than one ReLU layer and more than one pooling layer in the example sequence of neural network layers, process 400 may be used to generate the statistical model specifically for ReLU layer A or specifically for Pool A.

At 402, a neural network is used to analyze a set of data, wherein the neural network includes at least one selection layer. In some embodiments, the set of data that is input into the neural network comprises a plurality of images (e.g., each image is received at the input layer of the neural network as an array of pixel values), where the neural network is configured to analyze one image at a time. In some embodiments, the set of data that is input into the neural network comprises a plurality of recordings, where the neural network is configured to analyze one speech recording at a time.

In some embodiments, the set of data that is input into the neural network is a first labeled subset of a dataset. Where training data is input into the neural network, the known labels of the images are used to adjust the weights (e.g., used in the convolutional filters of the convolutional layers) of the neural network to generate outputs that more closely match the labels associated with the input.

In some embodiments, the set of data that is input into the neural network is validation data, such as a second labeled subset of the dataset. Where validation data, which is different from the data that is used for training, is input into the neural network, the set of data is used to verify the accuracy of the neural network by comparing the results with expected labels in order to determine whether additional training is needed and/or whether hyperparameters (e.g., the number of hidden units in the neural network) in the neural network need to be tuned.

In some embodiments, the set of data that is input into the neural network is testing data, such as a third labeled subset of the dataset. Where testing data is input into the neural network, the set of data is used to confirm the accuracy of the trained neural network by determining whether the results match the expected output.

In some embodiments, the set of data that is input into the neural network is live data such as data that is other than what was used to train, validate, and/or test the neural network. Where live data is input into a trained, validated, and/or tested neural network, the set of data is analyzed by the neural network using the weights that had been determined for the neural network.

While training data, validation data, testing data, and live data are noted as the example types of data that may be used to generate a statistical model for a selection layer, in actual practice, various other types of data may also be used to generate the statistical model.

At 404, a plurality of selections by the at least one selection layer is obtained from the using of the neural network to analyze the set of data. Whenever input data, regardless of the type, is input into the neural network, each instance of each type of selection layer processes the input array that it receives from an immediately preceding layer (or from the input interface if the selection layer is the first layer) by selecting the input values that are to be output to the immediately subsequent layer in the neural network. For example, if the selection layer were a ReLU layer, then the ReLU layer would selectively output the input values that are positive and output the remaining units of the output array as zeroes. For example, if the selection layer were a maximum pooling layer, then the maximum pooling layer would selectively output only each input value that is the maximum among each subregion of the input array that is within the dimensions of the pooling filter and ignore the remaining input values.

At 406, a statistical model corresponding to the at least one selection layer is generated using the plurality of selections. As the neural network is repeatedly run on the set of data (e.g., the neural network is run once for each input image of the input set of data), the units within the input array that are selected by the selection layer (for which the statistical model is generated) are recorded. Then, the statistical model for the selection layer is generated by using the recorded historical selections made by the selection layer over the course the neural network analyses of the set of data. Selections made by the selection layer are dependent on the input data that is fed into the neural network. In some embodiments, the selections by the selection layer can be recorded for a predetermined length of time or across a predetermined number of inputs (e.g., 10,000 inputs) to the neural network. In some embodiments, the statistical model comprises an array of the same dimensions as the array that is input into the selection layer from its immediately preceding layer in the neural network and the statistical model includes a probability (based on the recorded historical selections) (e.g., a percentage value or a ratio) that an input value in each unit of the input array into the selection layer would be selected by the selection layer.

Figure 5:
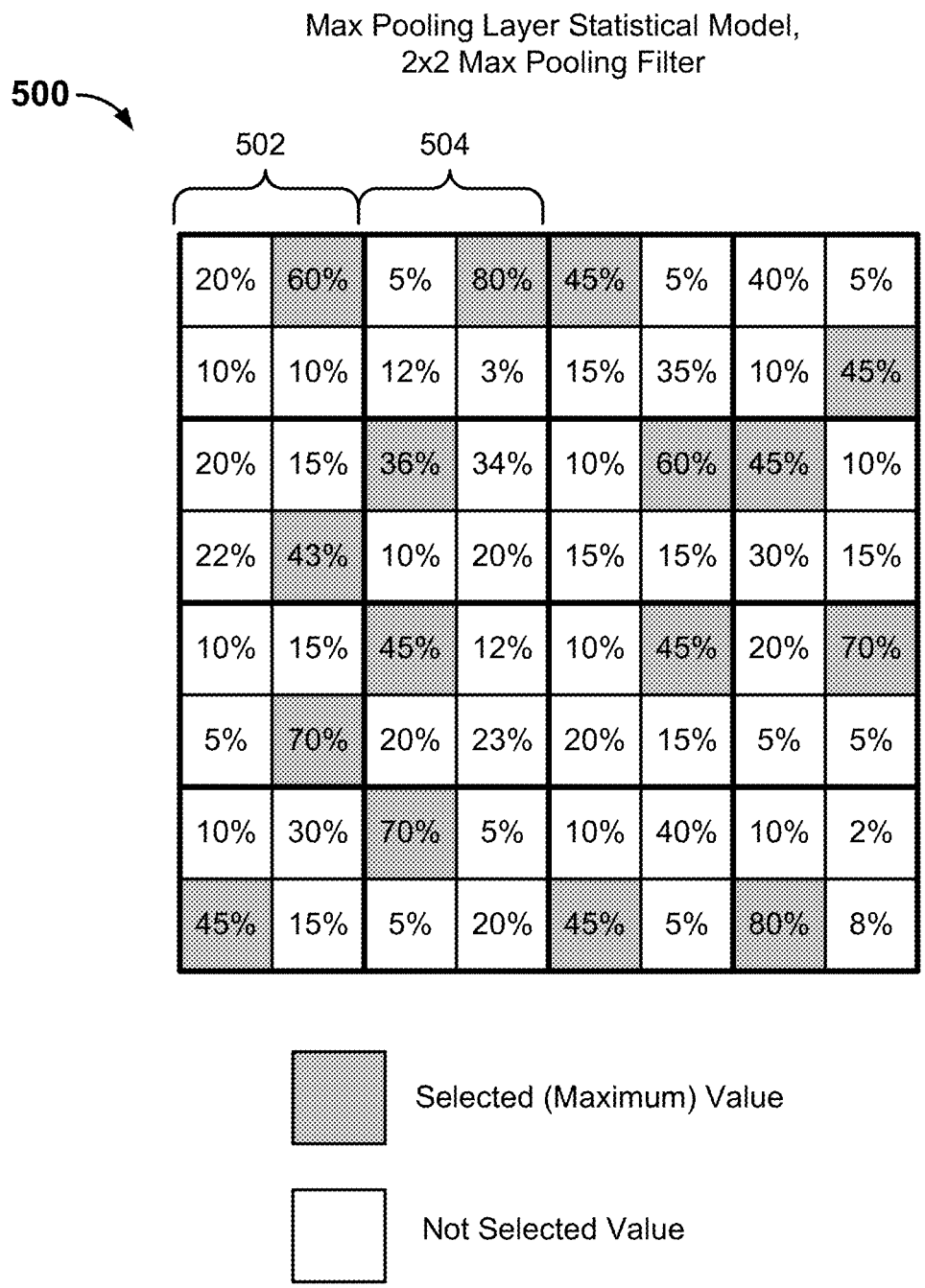
FIG. 5 is an example of a statistical model that is generated for a maximum pooling layer.

FIG. 5 is an example of a statistical model that is generated for a maximum pooling layer. In some embodiments, statistical model 500 is generated using a process such as process 400 of FIG. 4 for an instance of a maximum pooling layer in a neural network. In the example of FIG. 5, the example dimensions of statistical model 500 is 8×8, which are the same dimensions as the example input array that is input into the instance of the maximum pooling layer for which the model was generated. In the example of FIG. 5, the example pooling filter, which is used to define the size of the subregion of the input array into the instance of the maximum pooling layer from which a maximum input value was to be selected, is 2×2. The 8×8 dimensions of statistical model 500 and the 2×2 dimensions of the pooling filter are merely examples and a statistical model of a different dimension and a pooling filter of a different dimension may be used in actual practice. Each 2×2 subregion of statistical model 500, which includes four units of the array, is shown by a dark black border. Subregions 502 and 504 are just two examples of the 16 subregions that are shown in statistical model 500. Each unit within a 2×2 subregion includes a probability that the input value from that unit had been the maximum value of the four values and therefore selected for output by the maximum pooling layer during the historical period or historical number of instances over which the neural network was run and the historical selections that had been made by that maximum pooling layer during that period or number of instances. To take subregion 502 as an example, the upper right unit of the subregion had a 60% likelihood to include the maximum value during the historical processing by the maximum pooling layer. Furthermore, to take subregion 504 as another example, the upper right unit of the subregion had an 80% likelihood to include the greatest value during the historical processing by the maximum pooling layer. Statistical model 500 shows each unit within each 2×2 subregion that historically had the highest probability of being selected (as including the largest value) as a "selected" unit. Statistical model 500 also shows each unit within each 2×2 subregion that did not historically have the highest probability as being a "not selected" unit.

As will be explained in greater detail below, each unit of statistical model 500 that is not selected can be deterministically mapped back to a deterministic computation (e.g., convolution operation) in the convolutional layer that immediately preceded the instance of the maximum pooling layer from which statistical model 500 was generated that does not need to be performed because its resulting/output value is not likely to be selected for output by the immediately subsequent instance of the maximum pooling layer.

Figure 6:
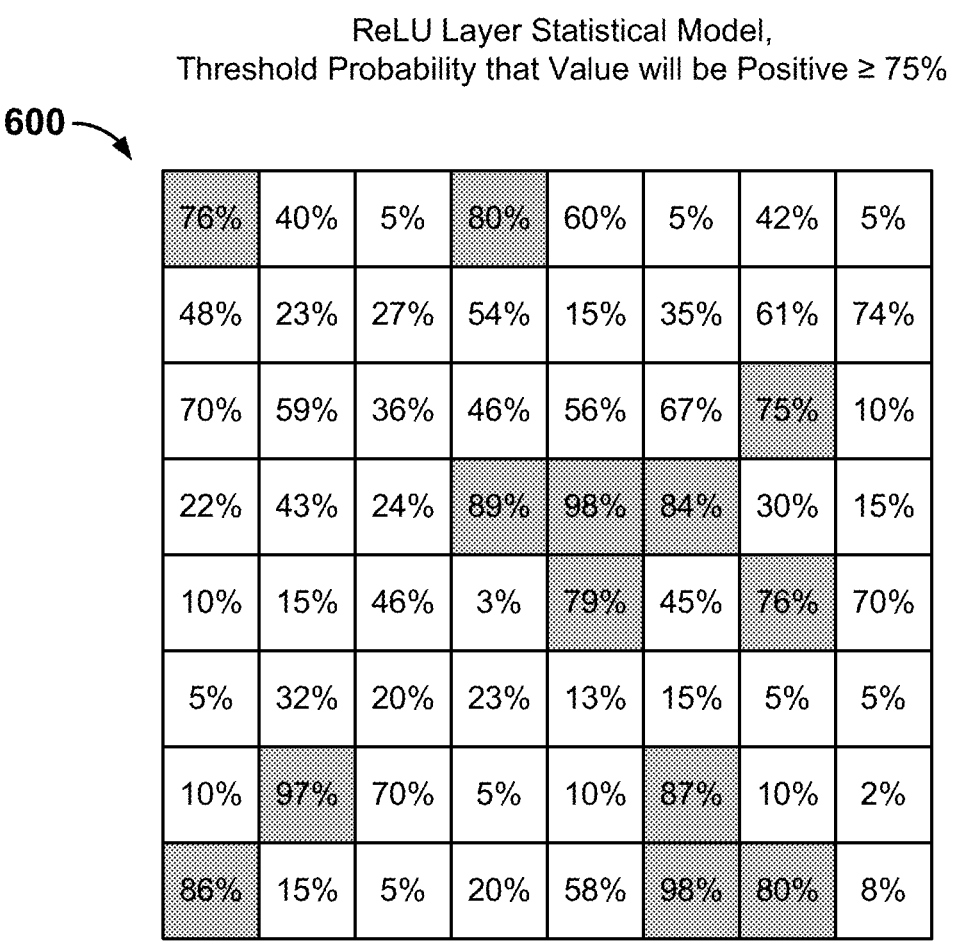
FIG. 6 is an example of a statistical model that is generated for a ReLU layer.
Figure 6:
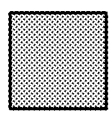
Figure 6:

FIG. 6 is an example of a statistical model that is generated for a ReLU layer. In some embodiments, statistical model 600 is generated using a process such as process 400 of FIG. 4 for an instance of a ReLU layer in a neural network. In the example of FIG. 6, the dimensions of statistical model 600 are 8×8, which are the same dimensions as the input array that is input into the instance of the ReLU layer for which the model was generated. Each unit within statistical model 600 includes a probability that the input value from that unit had been positive and therefore selected for output by the ReLU layer during the historical period or historical number of instances over which the neural network was run and the historical selections that had been made by that ReLU layer during that period or number of instances. In the example of FIG. 6, the threshold probability that is used to identify whether the probability of a unit is high enough to determine that its input value is positive and is therefore selected by that ReLU layer is 75%. In some embodiments, the threshold probability that is used to identify whether the probability of a unit is high enough to determine that its input value is positive and is therefore selected by that ReLU layer is determined empirically and is also tunable. As such, statistical model 600 shows each unit that historically has a high enough probability of being selected (for including a positive value) as a "selected" unit. Statistical model 600 also shows each unit that historically does not have a high enough probability of being selected (for including a negative value) as a "not selected" unit.

As will be explained in greater detail below, each unit of statistical model 600 that is not selected can be deterministically mapped back to a deterministic computation (e.g., convolution operation) in the convolutional layer that immediately preceded the instance of the ReLU layer from which statistical model 600 was generated. In various embodiments, each of such deterministic computations that is mapped to by a "not selected" unit in statistical model 600 will not need to be performed because its resulting/output value is not likely to be selected for output by the immediately subsequent instance of the ReLU layer.

While statistical model 500 of FIG. 5 and statistical model 600 of FIG. 6 are shown to be arrays, the statistical model may be represented by any other format that can identify whether each unit (e.g., by their row and column values) of the statistical model is either designated as selected or not selected.

Figure 7A:
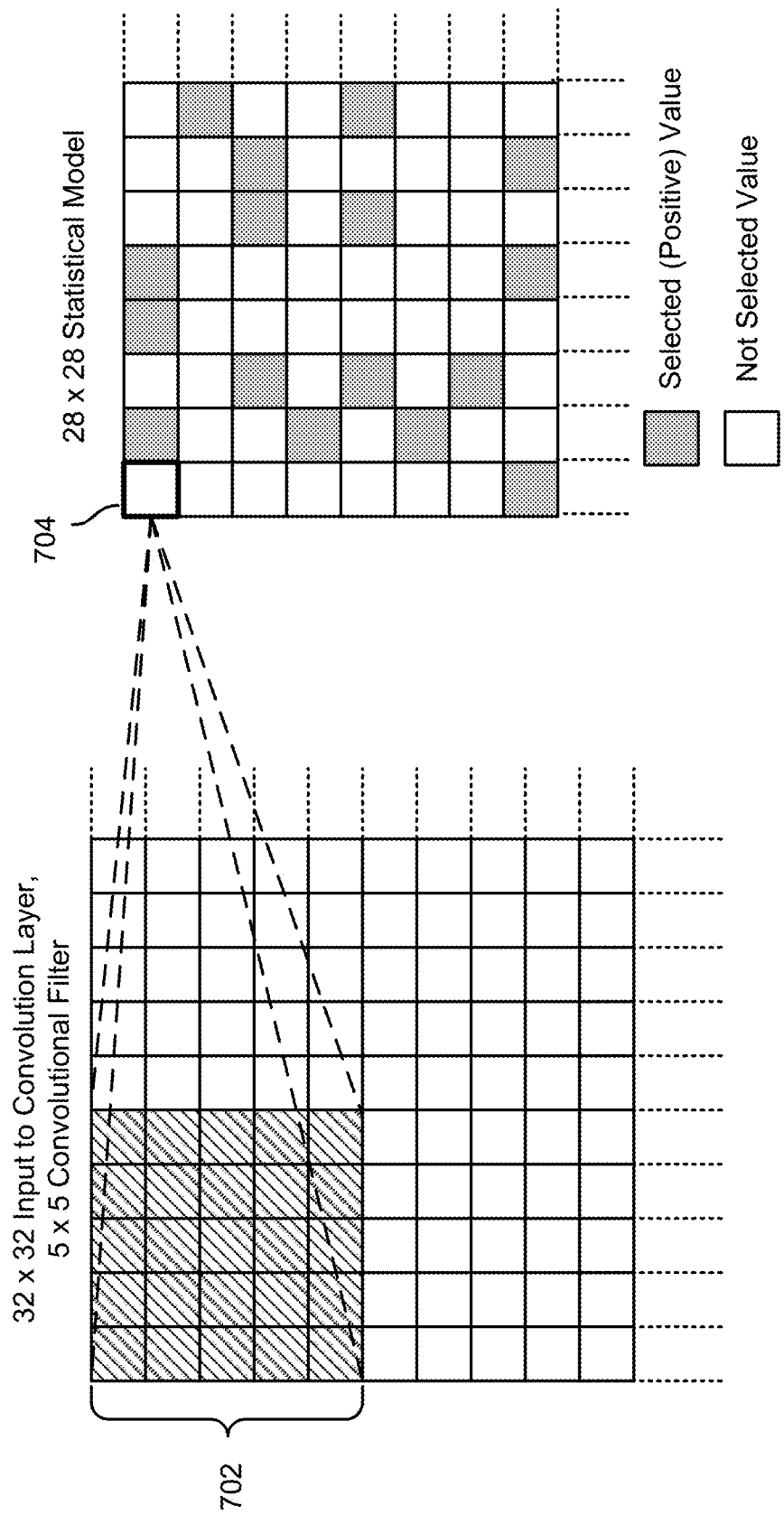
FIG. 7A is a diagram showing an example of mapping a not selected unit of a statistical model corresponding to a selection layer back to a deterministic computation in a convolutional layer that precedes the selection layer.
Figure 7B:
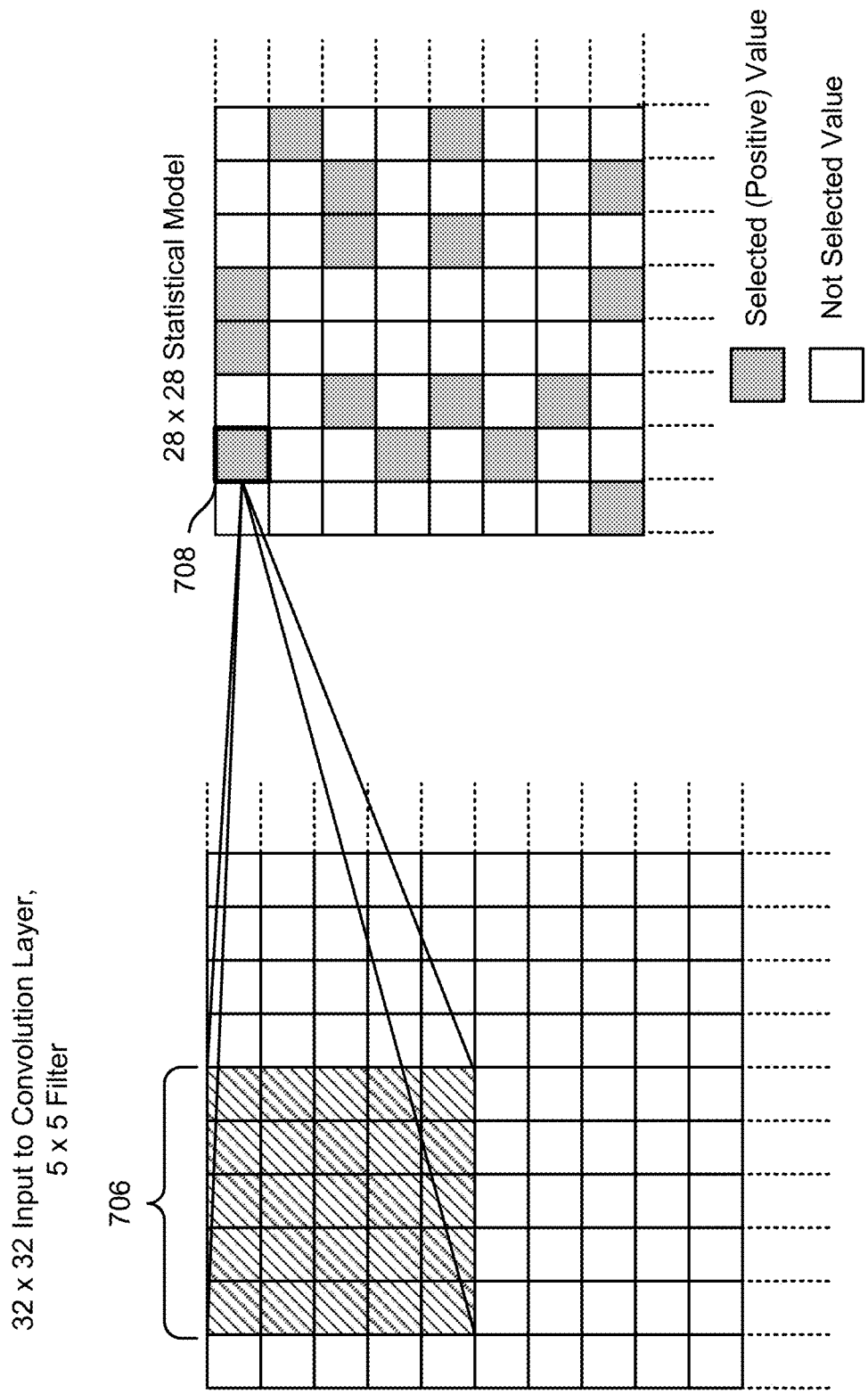
FIG. 7B is a diagram showing an example of mapping a selected unit of a statistical model corresponding to a selection layer back to a deterministic computation in a convolutional layer that precedes the selection layer.

FIGS. 7A and 7B are diagrams showing how a generated statistical model can be used to selectively perform deterministic computations in a convolutional neural network.

FIG. 7A is a diagram showing an example of mapping a not selected unit of a statistical model corresponding to a selection layer back to a deterministic computation in a convolutional layer that precedes the selection layer. In the example of FIG. 7A, the example dimensions of the statistical model are 28×28. Other dimensions are possible. The statistical model was generated for a selection layer (e.g., a ReLU layer or a pooling layer), which immediately follows a convolutional layer with a 32×32 input array. The relationship between the dimensions of the statistical model (28×28), which has the dimensions of the output array of the convolutional layer, to the dimensions of the input array (32×32) to the convolutional layer is described below. Because a statistical model is generated from historical data with respect to the selection layer's processing of its input array, which is the output array from its immediately preceding convolutional layer, the 28×28 dimensions of the statistical model are also the dimensions of the output array from the convolutional layer. Given that the convolutional layer slides a convolutional filter around different subregions of its input array and for each subregion, outputs a convolution operation result value based on the input values within that subregion and the weights within the filter, each resulting value of the convolutional layer's output array (and therefore, the statistical model) can be deterministically mapped back to a convolution operation involving a subregion of its input array. Mapping an output value in a particular unit of the statistical model to a corresponding subregion/convolution operation of the input array to the convolutional layer can be determined as a function of the convolutional filter size, the size of the input (e.g., image) array, and the stride. In the example of FIG. 7A, the convolutional layer has a 5×5 convolutional filter. Using a stride of one (the convolutional filter shifts by one unit over the input array to the convolutional layer at a time) to apply the 5×5 convolutional filter to the 32×32 array results in 784 convolution operations to be conventionally performed in the convolutional layer, where each convolution operation result value is stored in a corresponding unit in a 28×28 output array of the convolutional layer. However, using the 28×28 statistical model such as the one shown in FIG. 7A enables the determination of which of the 784 convolution operations can be skipped by the convolutional layer. As mentioned before, each "not selected" unit within the statistical model can be mapped back to a subregion of the input array to the convolutional layer that immediately precedes the selection layer for which the statistical model was generated for which a convolution operation with the convolutional filter does not need to be computed. This is because each "not selected" unit of the statistical model indicates that an output value of the convolutional layer is unlikely to be selected for output by the selection layer for further processing in the convolutional neural network. Therefore, the convolution operation whose resulting value is stored in that unit need not be computed and the values in the "not selected" units are presumed to not change the ultimate analysis of the convolutional neural network.

Specifically in the example of FIG. 7A, unit 704 of the 28×28 statistical model has been determined to include a "not selected" value that can be mapped back to its corresponding convolution operation that would be a function of the values in subregion 702 within the 32×32 convolutional layer and the weights in the 5×5 convolutional filter. As such, based on the "not selected" designation of unit 704 of the 28×28 statistical model, when the convolutional neural network is running, the convolutional layer with the 32×32 input array and which immediately precedes the selection layer for which the 28×28 statistical model was generated does not need to perform the convolution operation that involves the values within subregion 702 of the input array to the convolutional layer and the weights of the 5×5 convolutional filter.

The reduction of convolution operations that are performed in a convolutional layer using the statistical model that is generated using historical data associated with a selection layer that is immediately subsequent to the convolutional layer in the convolutional neural network not only saves computing resources but also speeds up the analysis performed by the entire convolutional neural network.

FIG. 7B is a diagram showing an example of mapping a selected unit of a statistical model corresponding to a selection layer back to a deterministic computation in a convolutional layer that precedes the selection layer. In the example of FIG. 7B, unit 708 of the 28×28 statistical model has been determined to include a "selected" value that can be mapped back to its corresponding convolution operation that would be a function of the values in subregion 706 within the 32×32 convolutional layer and the weights in the 5×5 convolutional filter. Converse to the example described in FIG. 7A, based on the "selected" designation of unit 708 of the 28×28 statistical model, when the convolutional neural network is running, the convolutional layer with the 32×32 input array and which immediately precedes the selection layer for which the 28×28 statistical model was generated does need to perform the convolution operation that involves the values within subregion 706 of the input array to the convolutional layer and the weights of the 5×5 convolutional filter.

Given that each "not selected" unit of the statistical model is mapped to a convolution operation that does not need to be performed in the convolutional layer, in the visible 8×8 portion of the example 28×28 statistical model in FIG. 7A and FIG. 7B, of the 64 convolution operations that would have conventionally been performed to output the 64 values, convolution operations corresponding to the only 16 "selected" units of the 8×8 subregion need to be performed.

Figure 8:
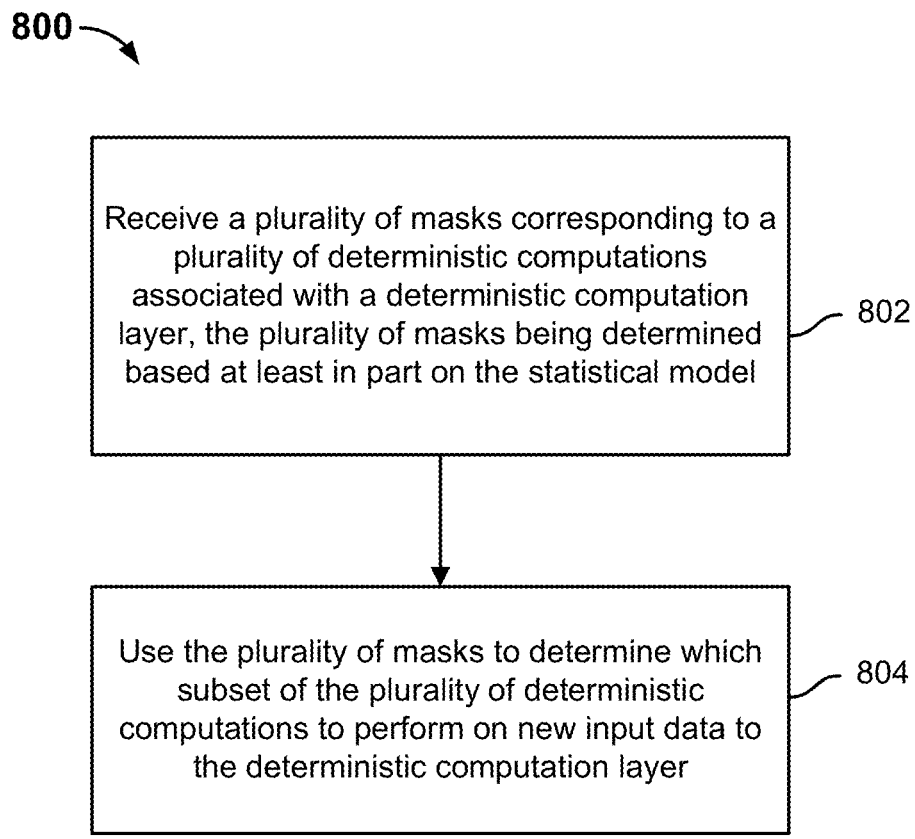
FIG. 8 is a flow diagram showing an example of a process for applying the statistical model to the performance of deterministic computations.

FIG. 8 is a flow diagram showing an example of a process for applying the statistical model to the performance of deterministic computations. In some embodiments, process 800 is performed at neural network system 100 of FIG. 1. In some embodiments, step 304 of process 300 of FIG. 3 may be performed at least in part by process 800.

At 802, a plurality of masks corresponding to a plurality of deterministic computations associated with a deterministic computation layer is received, the plurality of masks being determined based at least in part on the statistical model. In various embodiments, a "mask" comprises data that is used to define which subregions of an input array need to be processed. In various embodiments, the deterministic computation layer comprises a convolution layer in a convolutional neural network and the plurality of deterministic computations comprises the convolution operations to be performed as part of the convolutional layer. As described earlier, the statistical model that is generated for a selection layer can be used to selectively perform convolution operations in the convolutional layer that immediately precedes the selection layer, where each "not selected" unit within the statistical model can be deterministically mapped (using the stride, convolutional filter size, and the size of the input array to the convolutional layer) to a subregion of the input array to the convolutional layer and a convolution operation that would have been performed based on that subregion. In one example, a mask can be generated corresponding to each subregion of the input array to the convolutional layer based on a corresponding unit (which could be designated as "selected" or "not selected") of the statistical model, where the mask can be used to determine whether a convolution operation should be a performed on a particular subregion of the input array to the convolutional layer. In another example, a mask can be generated corresponding to only each subregion of the input array to the convolutional layer based on a corresponding "selected" unit of the statistical model such that convolutional operations are only performed for subregions for which masks exist and that convolutional operations are not performed for subregions for which masks do not exist. For example, each mask can be generated as a function of the stride, convolutional filter size, and the size of the input array to the convolutional layer.

At 804, the plurality of masks is used to determine which subset of the plurality of deterministic computations to perform on new input data to the deterministic computation layer. When new input data is fed into the convolutional neural network, the processing of the new input data by the convolutional layer that immediately precedes the selection layer for which the statistical model is generated is modified based on the masks, which will dictate which convolution operations are to be performed by the layer and which to skip. Thereby, masks are just one example technique by which a statistical model can be used to cause the convolution operations in a convolutional layer to be selectively performed.

FIG. 9 is a diagram showing how the use of a statistical model that is generated for a pooling layer can be used to modify the sequence of layers in a convolutional neural network. As shown in the example original sequence of layers in FIG. 9, the input layer (Input) is followed by the first convolutional layer (Cony A), which is followed by a pooling layer (Pool A), which is followed by the second convolutional layer (Cony B), which is followed by additional other layer(s) and ultimately by the fully connected layer (not shown). A statistical model is generated for Pool A based on historical data (e.g., historical processing of data by Pool A over a period). The statistical model that is generated for Pool A can then be used to modify the processing by Cony A. Specifically, the statistical model that is generated for Pool A can be used to selectively perform (perform fewer than all of the conventional) convolution operations that were performed by Cony A on its received input array. The version of Cony A that is modified by the statistical model that is generated for Pool A is denoted as Cony A' in FIG. 9. Cony A' is modified by the statistical model including by performing only those convolution operations that result in values that are designated as being selected by the statistical model and not performing those convolution operations that do not result in values that are designated as being selected by the statistical model. Furthermore, after Cony A is modified using the statistical model, Pool A, the selection layer from which the statistical model was generated, can also be removed (e.g., not implemented or implemented but not applied) from the convolutional neural network (as its historical selections have already been used to modify the processing of input values by its immediately preceding convolutional layer, thereby creating Cony A'). As such, after the statistical model is used to create Cony A', Pool A can be skipped (e.g., not implemented or implemented but not applied) and the array that is output by Cony A' is directly fed into Cony B.

FIG. 10 is a diagram showing how the use of a statistical model that is generated for a ReLU layer can be used to modify the sequence of layers in a convolutional neural network. As shown in the example original sequence of layers in FIG. 10, the input layer (Input) is followed by the first convolutional layer (Cony A), which is followed by a ReLU layer (ReLU A), which is followed by the second convolutional layer (Cony B), which is followed by additional other layer(s) and ultimately by the fully connected layer (not shown). A statistical model is generated for ReLU A based on historical data (e.g., historical processing of data by ReLU A over a period). The statistical model that is generated for ReLU A can then be used to modify the processing by Cony A. Specifically, the statistical model that is generated for ReLU A can be used to selectively perform (perform fewer than all of the conventional) convolution operations that were performed by Cony A on its received input array. The version of Cony A that is modified by the statistical model that is generated for ReLU A is denoted as Cony A' in FIG. 10. Cony A' is modified by the statistical model including by performing only those convolution operations that result in values that are designated as being selected by the statistical model and not performing those convolution operations that do not result in values that are designated as being selected by the statistical model. Furthermore, after Cony A is modified using the statistical model, ReLU A, the selection layer from which the statistical model was generated, can also be removed (e.g., not implemented or implemented but not applied) from the convolutional neural network (as its historical selections have already been used to modify the processing of input values by its immediately preceding convolutional layer, thereby creating Cony A'). As such, after the statistical model is used to create Cony A', ReLU A can be skipped and the array that is output by Cony A' is directly fed into Cony B.

As shown in the examples of FIGS. 9 and 10 above, the use of a statistical model that is generated for a selection layer in a convolutional neural network may not only be used to reduce the number of convolution operations that are performed in a convolution layer that precedes the selection layer, but the statistical model may also be used to remove the selection layer from being performed in the neural network altogether. Therefore, not only is the consumption of computing resources saved from the reduction in the number of convolution operations that are performed by a convolutional layer but also in the removal of the selection layer. Computational efficiency is greatly improved and the resulting neural network saves power and runs more quickly, without significant compromise to its accuracy.

In some embodiments, after the selection layer such as Pool A (of the example of FIG. 9) or ReLU A (of the example of FIG. 10) is removed from the neural network after the application of the statistical model to a convolutional layer in the neural network, the neural network may be retrained to improve its accuracy.

Figure 11:
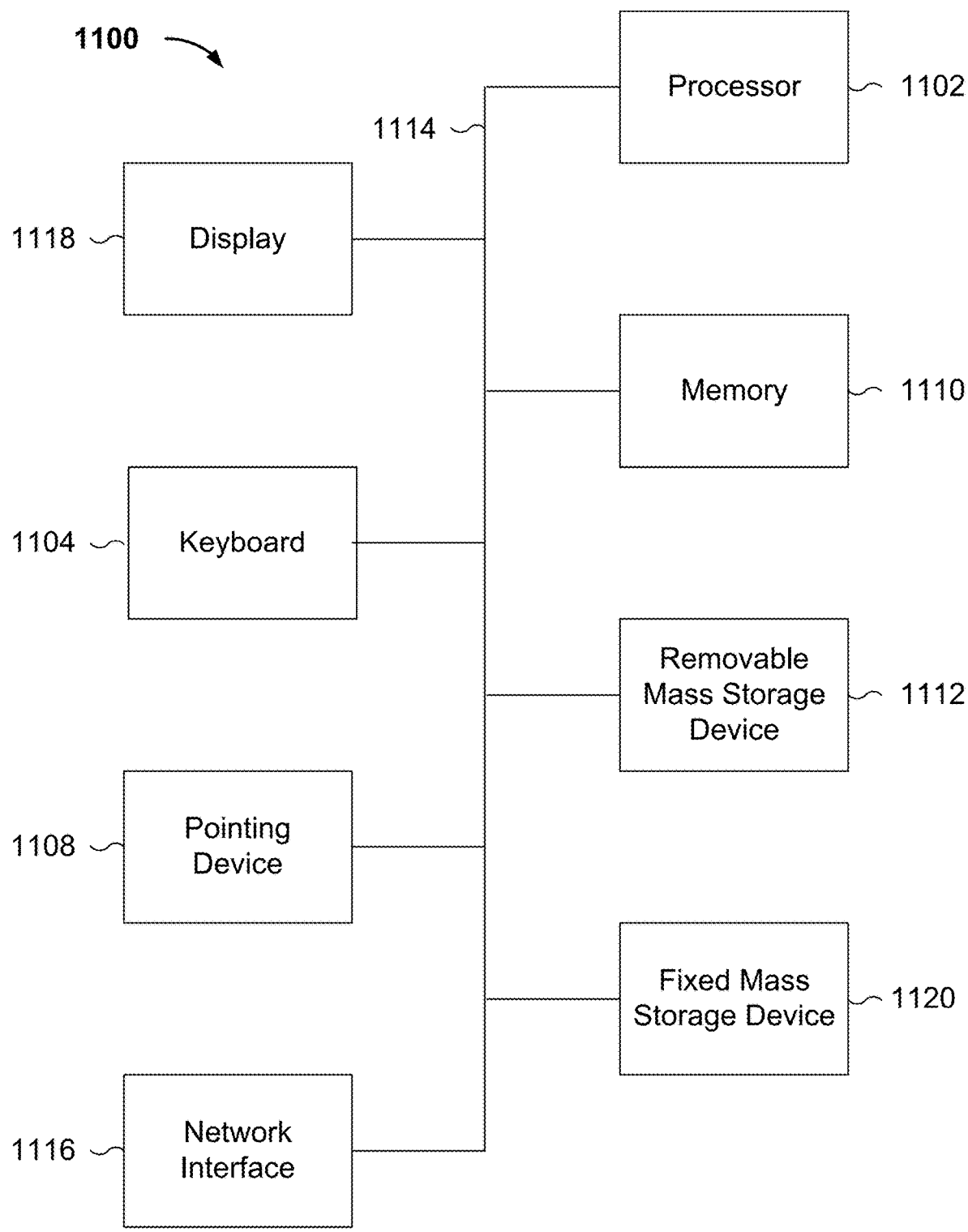
FIG. 11 is a functional diagram illustrating a programmed computer system for network packet event related script execution in accordance with some embodiments.

FIG. 11 is a functional diagram illustrating a programmed computer system for the performance of deterministic computations associated with neural networks in accordance with some embodiments. As will be apparent, other computer system architectures and configurations can be used to determine network packet event related script execution. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118).

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data, and objects used by the processor 1102 to perform its functions (e.g., programmed instructions). For example, memory 1110 can include any suitable computer-readable storage media, described below, depending on whether, for example, data access needs to be bi-directional or uni-directional. For example, processor 1102 can also directly and very rapidly retrieve and store frequently needed data in a cache memory (not shown).

A removable mass storage device 1112 provides additional data storage capacity for the computer system 1100, and is coupled either bi-directionally (read/write) or uni-directionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storages 1112, 1120 generally store additional programming instructions, data, and the like that typically are not in active use by the processor 1102. It will be appreciated that the information retained within mass storages 1112 and 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1108, as well as an auxiliary input/output device interface, a sound card, speakers, and other subsystems as needed. For example, the pointing device 1108 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 11 is but an example of a computer system suitable for use with the various embodiments disclosed herein. Other computer systems suitable for such use can include additional or fewer subsystems. In addition, bus 1114 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system of reducing computation of a deterministic computation layer in a neural network, comprising:
 a processor configured to:
  obtain a statistical model for a selection layer of the neural network, the statistical model indicating probabilities that corresponding values are selected by the selection layer, the statistical model being generated using historical data;
  selectively perform a subset of a plurality of deterministic computations on new input data to the neural network, the plurality of deterministic computations being associated with the deterministic computation layer, the selective performance of the deterministic computations being based at least in part on the statistical model and generating a computation result; and output the computation result to another layer in the neural network; and
a memory coupled to the processor and configured to provide the processor with instructions.

2. The system of claim 1, wherein to obtain the statistical model for the selection layer of the neural network comprises to:
use the neural network to analyze a set of data;
obtain a plurality of selections by the selection layer from the using of the neural network to analyze the set of data; and
generate the statistical model for the selection layer using the plurality of selections.

3. The system of claim 2, wherein the set of data comprises one or more of the following: a set of training data, a set of validation data, a set of testing data, and a set of live data.

4. The system of claim 1, wherein the deterministic computation layer precedes the selection layer in the neural network.

5. The system of claim 1, wherein to selectively perform the subset of the plurality of the deterministic computations on the new input data to the neural network comprises to:
receive a plurality of masks corresponding to the plurality of deterministic computations, the plurality of masks being determined based at least in part on the statistical model; and
use the plurality of masks to determine which of the plurality of deterministic computations to perform on the new input data.

6. The system of claim 1, wherein to selectively perform the subset of the plurality of the deterministic computations on the new input data to the neural network comprises to:
map a unit that is indicated by the statistical model as being not selected to a corresponding deterministic computation; and
omit performing the corresponding deterministic computation on the new input data.

7. The system of claim 1, wherein the selection layer comprises a pooling layer.

8. The system of claim 1, wherein the selection layer comprises a Rectified Linear Unit (ReLU) layer.

9. The system of claim 1, wherein the other layer in the neural network to which the computation result is output is not the selection layer.

10. The system of claim 1, wherein the plurality of deterministic computations comprises a plurality of convolution operations.

11. A method for reducing computation of a deterministic computation layer in a neural network, comprising:
obtaining a statistical model for a selection layer of the neural network, the statistical model indicating probabilities that corresponding values are selected by the selection layer, the statistical model being generated using historical data;
selectively performing a subset of a plurality of deterministic computations on new input data to the neural network, the plurality of deterministic computations being associated with the deterministic computation layer, the selective performance of the deterministic computations being based at least in part on the statistical model and generating a computation result; and
outputting the computation result to another layer in the neural network.

12. The method of claim 11, wherein obtaining the statistical model for the selection layer of the neural network comprises:
using the neural network to analyze a set of data;
obtaining a plurality of selections by the selection layer from the using of the neural network to analyze the set of data; and
generating the statistical model for the selection layer using the plurality of selections.

13. The method of claim 12, wherein the set of data comprises one or more of the following: a set of training data, a set of validation data, a set of testing data, and a set of live data.

14. The method of claim 11, wherein the deterministic computation layer precedes the selection layer in the neural network.

15. The method of claim 11, wherein selectively performing the subset of the plurality of the deterministic computations on the new input data to the neural network comprises:
receiving a plurality of masks corresponding to the plurality of deterministic computations, the plurality of masks being determined based at least in part on the statistical model; and
using the plurality of masks to determine which of the plurality of deterministic computations to perform on the new input data.

16. The method of claim 11, wherein selectively performing the subset of the plurality of the deterministic computations on the new input data to the neural network comprises:
mapping a unit that is indicated by the statistical model as being not selected to a corresponding deterministic computation; and
omitting performing the corresponding deterministic computation on the new input data.

17. The method of claim 11, wherein the selection layer comprises a pooling layer.

18. The method of claim 11, wherein the selection layer comprises a Rectified Linear Unit (ReLU) layer.

19. A computer program product for reducing computation of a deterministic computation layer in a neural network, the computer program product being embodied in a non-transitory computer readable storage medium and comprising computer instructions for:
obtaining a statistical model for a selection layer of the neural network, the statistical model indicating probabilities that corresponding values are selected by the selection layer, the statistical model being generated using historical data;
selectively performing a subset of a plurality of deterministic computations on new input data to the neural network, the plurality of deterministic computations being associated with the deterministic computation layer, the selective performance of the deterministic computations being based at least in part on the statistical model and generating a computation result; and
outputting the computation result to another layer in the neural network.

20. The computer program product of claim 19, wherein obtaining the statistical model for the selection layer of the neural network comprises:
using the neural network to analyze a set of data;
obtaining a plurality of selections by the selection layer from the using of the neural network to analyze the set of data; and
generating the statistical model for the selection layer using the plurality of selections.

* * * * *

UNITED STATES PATENT AND TRADEMARK OFFICE
CERTIFICATE OF CORRECTION

| | | |
|---|---|---|
| PATENT NO. | : 11,410,016 B2 | Page 1 of 1 |
| APPLICATION NO. | : 16/395764 | |
| DATED | : August 9, 2022 | |
| INVENTOR(S) | : Lingjie Xu and Wei Wei | |

It is certified that error appears in the above-identified patent and that said Letters Patent is hereby corrected as shown below:

In the Drawings

In sheet(s) 4 of 12, figure 4, block 406, before "least", insert --at--.

Signed and Sealed this
Fourth Day of April, 2023

*Katherine Kelly Vidal*

Katherine Kelly Vidal
*Director of the United States Patent and Trademark Office*